TAPE DRIVE MECHANISM

Filed June 3, 1963

INVENTORS
SAMUEL GILMAN

BY Fulwider, Patton, Rieber
Lee, and Utecht
ATTORNEYS 3,244,341
TAPE DRIVE MECHANISM Samuel Gilman, Arcadia, Calif., assignor to United Data Control, Inc., South El Monte, Calif., a corporation of Washington Filed June 3, 1963, Ser. No. 285,049
4 Claims. (Cl. 226—188)

This invention relates generally to improvements in tape drive mechanisms for magnetic recording and playback devices, and more particularly to a new and improved tape drive means for tape cartridges of the plug-in variety such as shown in my copending application Serial No. 165,895, filed January 12, 1962, for Magnetic Tape Cartridge.

In magnetic recording and playback systems, it has been common practice to employ tape reels for supporting a length of magnetic tape which, by way of appropriate guide means, transport the tape past a magnetic transducer for recording, playback, erasing or the like. Such reel-type tape storage and transport means have not proved entirely satisfactory because of the unavoidable distortion introduced in recorded or reproduced signals, e.g., as a result of the variable torque requirements of the tape reeling system as the tape is directed from one reel to the other.

Difficulties encountered with reel-type mechanisms have led to the development of continuous loop tape cartridges, e.g., of the type set forth in the aforementioned application. In this type of cartridge, the tape is not carried on reels, but rather is deposited in a compartment and looped about an idler wheel therein adapted to be engaged by an external drive wheel. Such cartridges also embody various types of guiding structure and pressure pad arrangements for transporting the tape past a magnetic transducer and maintaining adequate physical contact between the tape and the transducer for proper recording, playback, or the like.

Various attempts have been made to provide tape drive mechanisms for such continuous loop cartridges wherein tape transport guiding structure within the cartridges could be kept to a minimum and pressure pad arrangements wholly eliminated. Moreover, such tape drive mechanisms should desirably be characterized by constant speed for enhanced recording and playback quality, low tension for increased tape life, and should also be capable of shielding the tape medium from exposure to dust and other foreign matter encountered by way of access openings through which the external drive means engages the drive mechanism within the cartridge.

Unfortunately, attempts to develop such tape drive mechanisms have suffered from a number of deficiencies including high cost, lack of constant tape speed, and the tendency for the tape to accumulate and jam in various sections of the cartridge.

Accordingly, it is an object of the present invention to provide a new and improved continuous loop magnetic tape cartridge embodying a tape drive mechanism which overcomes the above and other disadvantages of the prior art.

Another object is to provide a jam-free, constant speed, low tension tape drive means within a magnetic tape cartridge.

A further object of the invention is the provision of a novel tape drive means which prevents direct contact between an external drive source and the tape medium within the cartridge, and thereby minimizes exposure of the tape to dust and other foreign matter.

Still another object is to provide a tape drive mechanism which minimizes the need for tape guiding structure within the cartridge, and also eliminates the need for pressure pads to hold the tape in physical contact with a magnetic transducer.

Yet another object of the present invention is the povision of a belt drive mechanism for transporting magnetic tape within a continuous loop tape cartridge, whereby undesired accumulation of tape within the cartridge is avoided.

The above and other objects and advantages of this invention will be better understood by reference to the following detailed description when considered in connection with the accompanying drawing of illustrative embodiments thereof, wherein.

Figure 1:
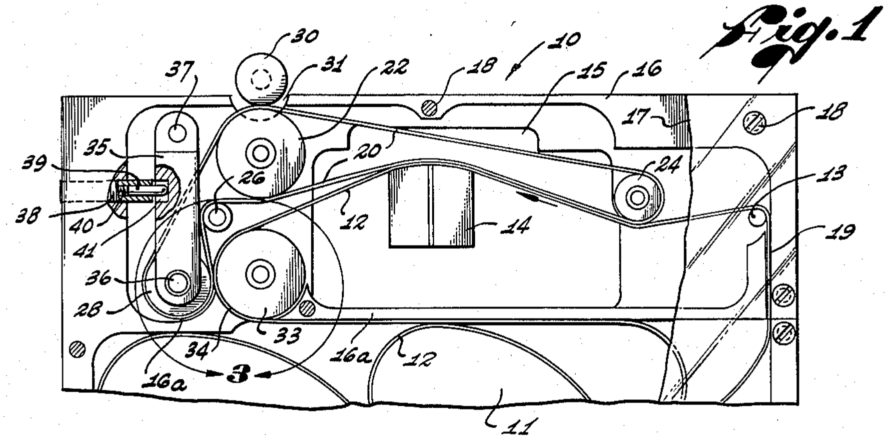
FIGURE 1 is a top plan view of a continuous loop magnetic tape cartridge, portions being broken away, embodying a belt tape drive mechanism in accordance with the present invention.

Referring now to the drawing, and particularly to FIGURE 1 thereof, the numeral 10 designates a magnetic tape cartridge adapted for random storage of a single loop of continuous magnetic tape 12 within a sealed compartmented structure. The cartridge 10 includes a casing 16 fabricated of any suitable rigid structural material, and preferably of a nonmagnetic metal such as aluminum or the like. The casing 16 houses the various structural components of the cartridge 10 and includes a wall *16a* which divides the casing into a tape storage compartment 11 and a recording and tape transport compartment 15.

A cover plate 17 is provide for the cartridge 10 and is secured to the casing 16 by any suitable fastening means such as the screws 18. The manner in which the casing 16 cooperates with the cover plate 17 to seal the cartridge 10, as well as the details of guiding and storing the continuous loop of magnetic tape 12 in a randomly folded fashion within the storage compartment 11, are adequately set forth in the aforementioned application Serial No. 165,895, and, accordingly, no further discussion of these structural features will be presented here. It will be noted, however, in FIGURE 4 that the internal thickness dimensions of the cartridge 10, with the cover plate 17 installed upon the casing 16, are substantially equal to the width of the tape 12, and the major structural components of the cartridge are essentially coplanar.

The cartridge 10 carries a magnetic transducer assembly 14 within the recording and tape transport compartment 15. Also within the compartment 15 is a low tension tape drive mechanism incorporating a belt 20 which engages the tape 12 as it exits from the storage compartment 11 and transports the tape past the mangetic transducer 14. The belt 20 also maintains the tape 12 in physical engagement with the transducer 14 for recording, playback or erasing.

The tape 12 enters the transducer and tape transport compartment 15 by way of a slot 19 in the casing wall *16a* at the right side of the compartment, the slot communicating the tape storage compartment 11 with the tape transport compartment 15. The width of the slot 19 is such as to permit free passage of the tape 12 without binding or jamming. In this regard, the slot 19 must not be so wide as to allow the tape 12 to accumulate or buckle within the slot, yet must be sufficiently wide to pass a splice (not shown) between the two ends of the tape. In actual practice, a slot width of the order of magnitude of 1½ to 3 times the thickness of the tape 12 has proven to be satisfactory.

Upon entering the tape transport compartment 15 by way of the slot 19, the tape 12 passes around a guide post 13 and is engaged by the belt 20 of the tape drive mechanism. The belt 20 is en endless loop belt and is preferably fabricated of a material having a relatively high coefficient of friction with magnetic tape, e.g., plastic or the like.

The belt 20 is threaded around a first relatively large diameter idler roller 22 at the left side of the compartment 15 in FIGURE 1, then across the compartment and around a smaller idler roller 24 at the right side of the compartment 15, thereafter to and around a guide roller 26 and an idler pressure roller 28, both at the left side of the compartment 15, and then back to the larger idler roller 22.

The large idler roller 22 is engaged by an external drive wheel or capstan 30 which enters the compartment 15 through an opening 31 provided in a forward wall of the casing 16. The capstan 30 pinches the belt 20 against the idler roller 22 and thereby drives the belt around the idler rollers 22, 24, 28 and the guide roller 26.

As previously indicated, after passing from the slot 19 and entering the compartment 15, the tape 12 is engaged by the belt 20, and, by virtue of frictional engagement therewith, is carried along with the belt. Hence, the linear velocity of the tape 12 coincides with that of the belt 20, and the latter provides a convenient means for controlling the tape speed.

The magnetic transducer 14 is positioned within the compartment 15 so that it contacts the underside of the tape 12 as it is being transported by the belt 20. To this end, the belt 20 guides the tape 12 across the compartment 15 to the transducer 14 and, by virtue of the relative location of the belt, tape and transducer within the compartment, maintains the tape in physical contact with the transducer as the tape passes the latter, thereby eliminating the need for supplemental pressure pads to insure such physical contact between the tape and transducer.

After passing the magnetic transducer 14, the belt 20 and tape 12 are physically separated from each other, for reasons which will become apparent. The tape 12 is directed from the magnetic transducer 14 to a tape guide roller 33 located in the lower left-hand portion of the tape transport compartment 15 in FIGURE 1. The tape 12 passes around the guide roller 33 and through a slot 34, formed by the external surface of roller 33 and the wall 16*a* of the casing 16, into the tape storage compartment 11.

On the other hand, the belt 20, which physically separates from the tape 12 after carrying the latter past the magnetic transducer 14, is directed around the guide roller 26 and then around the pressure roller 28, the latter roller performing the dual function of guiding the belt 20 and providing an auxiliary frictional drive for the tape guide roller 33. The position of the roller 28, and hence the pressure of the belt 20 against that portion of the tape 12 wrapped around the tape guide roller 33, is controlled by a pivotal arm 35 which carries the shaft 36 about which the pressure roller 28 rotates, and which is pivoted about an axis 37 secured to the casing 16. The angular position of the arm 35 and pressure roller 28 is adjusted by means of a set screw 38 which extends through the left side wall of the casing 16. The set screw 38 carries a spring biased pin assembly 39, 40 adapted to engage a grooved seat 41 within the arm 35, and thereby controls the contact pressure between the belt 20 and tape 12 in the space between the rollers 28 and 33.

The relative positions of the rollers 26, 28 and 33 are such that the belt 20 rejoins the tape 12 at only a single line of tangential contact (perpendicular to the plane of the drawing) between rollers 28 and 33, whereby accumulation of tape in the compartment 15 between the guide roller 33 and the magnetic transducer 14 is avoided. To accomplish this, the guide roller 26 holds the belt 20 away from the tape 12 and alters the angle of approach of the belt to the rollers 28 and 33 so that the belt 20 cannot wrap around the roller 33. Instead, the belt 20 wraps around the roller 28 with essentially only single line contact against the tape 12 which is, in turn, wrapped around the roller 33.

Figures 2, 3, 4, 5:
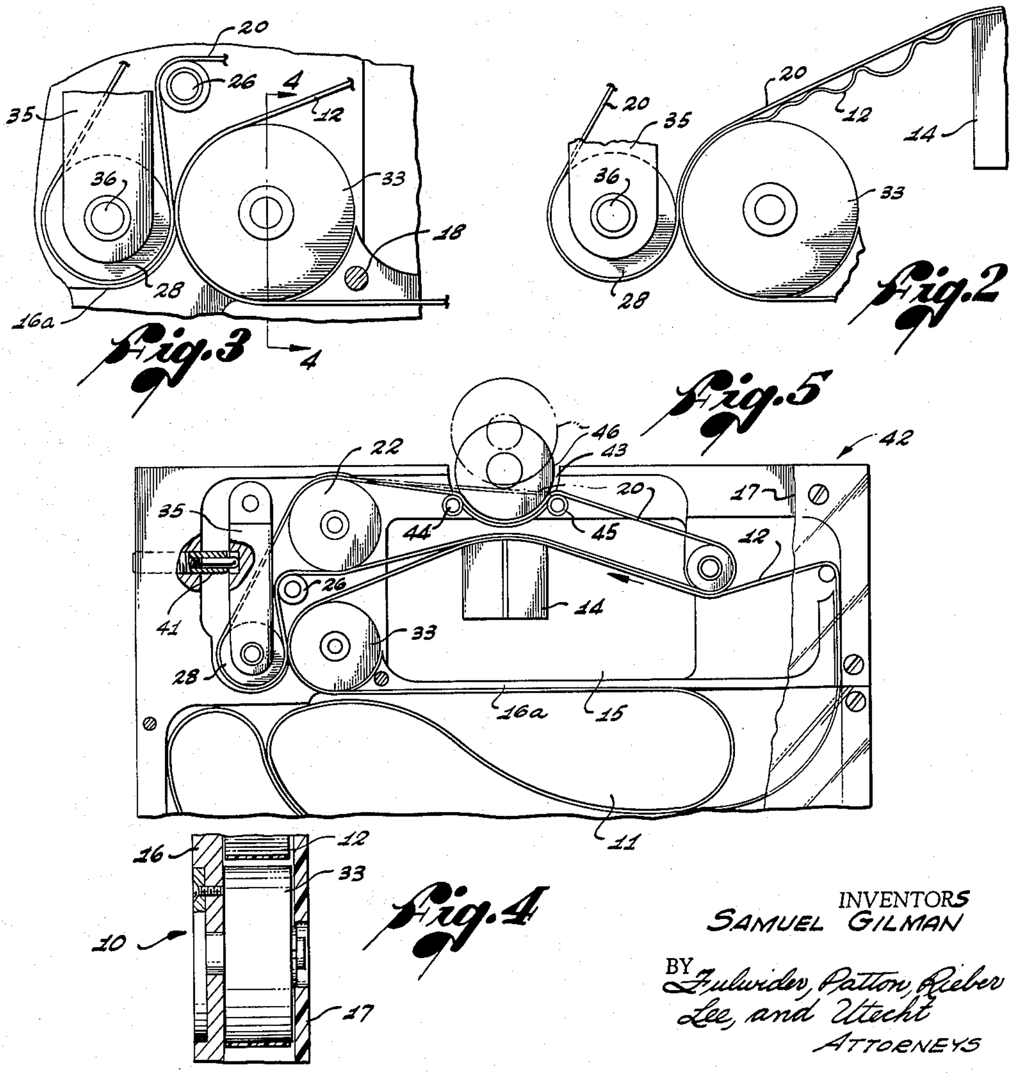
FIGURE 2 is a partial plan view illustrating the manner in which tape may undesirably accumulate within the cartridge in certain types of belt drive arrangements.
FIGURE 3 is an enlarged partial plan view of the general area 3 of FIGURE 1, and illustrates one feature of the belt tape drive mechanism of the present invention which avoids the undesirable tape accumulation shown in FIGURE 2.
FIGURE 4 is a fragmentary sectional view, taken along the line 4—4 of FIGURE 3, and illustrates the relative dimensions of the tape and cartridge cross sections.
FIGURE 5 is a partial plan view illustrating an alternate means for driving the belt used to transport the tape in accordance with the invention.

Referring now particularly to FIGURE 2, there is illustrated a drive mechanism for the magnetic tape 12, wherein the belt 20 is not immediately separated from the tape after passing the transducer 14, but rather is wrapped around the roller 33 with the tape before being separated from the tape and carried around the pressure roller 28. It will be observed in FIGURE 2, that the omission of the guide roller 26 for the belt 20, and wrapping of the belt around the roller 33 with the tape 12, causes the tape 12 to slow down and accumulate in the region between the roller 33 and the transducer 14. The reasons for this undesirable tape accumulation are set forth below.

By virtue of its wrapping around the roller 33, the belt 20 imparts a constant angular velocity to the tape drive roller 33. This angular velocity imparted to the roller 33 is directly proportional to the linear velocity at which the belt 20 is travelling. However, since the radial distances from the center of the tape roller 33 to the tape 12 and belt 20 are different, the linear velocities of the tape and the belt must be different. Consequently, the belt 20, which is further from the center of the roller 33 than the tape 12, moves at the same angular velocity as the tape but at a greater linear velocity than that of the tape.

Since the tape 12 is moving at the same speed as the belt 20 before it reaches the guide roller 33, but slows down at the roller 33 because of the aforedescribed conditions, the difference in tape velocities causes the tape to build up in the region between the tape guide roller and the transducer 14. Such accumulation of tape is extremely undesirable, since the tape will eventually buckle and jam the drive mechanism.

Referring now particularly to FIGURE 3, there is shown a belt tape drive mechanism which avoids the undesired tape accumulation of the arrangement shown in FIGURE 2. In FIGURE 3, the belt 20 and tape 12 are physically separated from each other after they pass the transducer 14. The tape 12 is directed from the transducer 14 directly to the tape guide roller 33, around the tape roller 33, and thence into the tape storage compartment 11. On the other hand, the belt 20 is directed to the guide roller 26 positioned above the tape roller 33. The belt 20 passes around the guide roller 26 and is then directed to and around the pressure roller 28 carried by adjustable arm 35. In passing around the roller 28, the belt 20 contacts the tape 12 in the region between the rollers 28 and 33, and thereby drives the roller 33. However, by virtue of the relative positions of the rollers 26, 28 and 33, the angle of approach of the belt 20 to the guide roller 33 is such that there is essentially only a single line of tangential contact across the width of the tape 12. The result of this tangential contact arrangement for driving the roller 33 and tape 12 is that there is essentially no differential linear velocity between different portions of the tape moving through the compartment 15. Therefore, the tape 12 moves at the same linear velocity as the belt 20 at all points along its path in the compartment 15 and the latter eliminates the undesired tape accumulation of FIGURE 2, thereby avoiding jamming of the cartridge mechanisms from this cause.

FIGURE 4 illustrates an alternate arrangement for driving the belt 20 within a cartridge 40 which substantially duplicates the structural arrangement of the cartridge 10 of FIGURE 1 in all other respects. The major distinction between the arrangement of FIGURE 4 and that of FIGURE 1 is that the drive roll 30 does not pinch the belt against the large idler roller 22. Instead, the small drive wheel 30 and opening 31 are replaced by a casing opening 43 and a selectively positioned large capstan 45 which is adapted to move in and out of the opening 43 between the solid and phantom positions shown in FIGURE 4. In the phantom position of the capstan 45, there is no contact between it and the belt 20. However, when the capstan 45 is moved to the solid position shown in FIGURE 4, it wraps around the belt 20, thereby tensioning and imparting driving movement to the belt. To improve the degree of wrapping, a pair of small guide rollers 44, 45 are included in the compartment 15. These guide rollers are spaced apart approximately the full diameter of the capstan 45 so that the belt 20 will conform more closely to the circumferential curvature of the capstan when engaged thereby.

The wrap-around technique of driving the belt 20 has the advantage over the pinch-roll drive arrangement of FIGURE 1 in that the belt 20 does not remain in tension when the tape drive mechanism is not in operation. Hence, the life of the belt 20 is substantially enhanced.

The tape drive mechanisms of the present invention have the additional advantage of possessing very low inertia characteristics in operation, since the only inertia forces are those of the weight of the tape 12 itself. Therefore, the drive system is constant speed, constant torque, and extremely positive in its action. Hence, complicated braking systems are not required, and wow and flutter distortion are substantially eliminated.

The belt tape drive mechanisms of the present invention satisfy a long existing need in the art for a compact, low tension, low inertia, substantially jam-free tape drive means within a sealed magnetic tape cartridge unit. Moreover, the tape drive mechanisms of the present invention are also characterized by ruggedness, reliability, and a marked lack of susceptibility to tape accumulation and damage.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:

1. In a magnetic tape cartridge adapted to randomly store a continuous loop of magnetic tape, the combination comprising:
   a magnetic transducer unit within said cartridge;
   a continuous loop tape drive belt in contact with a portion of said tape for transporting said tape past said transducer unit and maintaining said tape in physical contact with said transducer unit;
   a tape guide roller adapted to engage a portion of said tape after said tape has been transported past said transducer unit;

roller means for imparting a controlled linear velocity to said drive belt;
   a first belt guide roller spaced from said tape guide roller for physically separating said belt from said tape when said tape and belt have passed said magnetic transducer unit;
   and a second belt guide roller, said second guide roller being adjustable to bring about substantially single line tangential contact across the width of said tape between said belt and the portion of said tape engaged by said tape guide roller, whereby said drive belt imparts motion to said tape and said tape guide roller without causing said tape to slow down and accumulate within said cartridge between said transducer unit and said tape guide roller.

2. A combination as defined by claim 1, including:
   an arm within said cartridge for carrying said second belt guide roller, said arm being pivoted about a fixed axis within said cartridge;
   and means to adjust the position and biasing force of said arm within said cartridge, whereby the contact pressure between said belt and said tape in the space between said second belt guide roller and said tape guide roller may be controlled.

3. A combination as set forth in claim 1, wherein said roller means for imparting a controlled velocity to said drive belt includes:
   roller means for supporting said drive belt in an untensioned state when said drive mechanism is not in operation;
   a driving capstan adapted to selectively engage and tension said belt;
   and a pair of rollers spaced apart a distance substantially equal to the diameter of said capstan, whereby to enhance the degree of wrapping of said belt around said capstan when engaged thereby.

4. A method of eliminating undesired tape accumulation within a tape cartridge embodying a drive belt for transporting said tape past a magnetic transducer within said cartridge, comprising:
   contacting a portion of said tape with said belt to transport said tape past said magnetic transducer;
   physically separating said belt from said tape after passing said magnetic transducer;
   and subsequently rejoining said belt and said tape in substantially single line contact across the width of said tape adjacent a body moving with constant angular velocity.

References Cited by the Examiner

UNITED STATES PATENTS

| | | | |
|---|---|---|---|
| 2,576,217 | 11/1951 | Eggleston | 198—203 X |
| 2,973,084 | 2/1961 | Sinden et al. | 198—203 |
| 3,065,922 | 11/1962 | Ballauf | 242—55.13 |
| 3,103,355 | 9/1963 | Hubbard et al. | 271—34 X |
| 3,114,512 | 12/1963 | Peshel et al. | 242—55.12 |

ROBERT B. REEVES, *Primary Examiner.*

RAPHAEL M. LUPO, *Examiner.*

C. AOUSSAT, W. McCARTHY, *Assistant Examiners.*